(12) United States Patent
Christie et al.

(10) Patent No.: US 9,746,365 B2
(45) Date of Patent: Aug. 29, 2017

(54) CONTROL HEAD

(71) Applicant: Buerkert Werke GmbH, Ingelfingen (DE)

(72) Inventors: Christopher Christie, Essen (DE); Volker Haaf, Crailsheim (DE); Volker Ruff, Rot am See (DE)

(73) Assignee: Buerkert Werke GmbH, Ingelfingen (DE)

( * ) Notice: Subject to any disclaimer, the term of this patent is extended or adjusted under 35 U.S.C. 154(b) by 252 days.

(21) Appl. No.: 14/563,343

(22) Filed: Dec. 8, 2014

(65) Prior Publication Data

US 2015/0160060 A1  Jun. 11, 2015

(30) Foreign Application Priority Data

Dec. 9, 2013 (DE) ........................ 10 2013 113 726

(51) Int. Cl.
| | | |
|---|---|---|
| *G01F 15/14* | (2006.01) | |
| *F16K 27/12* | (2006.01) | |
| *F16K 31/00* | (2006.01) | |

(52) U.S. Cl.
CPC .............. *G01F 15/14* (2013.01); *F16K 27/12* (2013.01); *F16K 31/00* (2013.01)

(58) Field of Classification Search
CPC ......... G01F 15/14; G01F 15/18; G01D 11/24; G01D 11/28; H05K 5/0017
See application file for complete search history.

(56) References Cited

U.S. PATENT DOCUMENTS

| | | | | |
|---|---|---|---|---|
| 7,826,992 | B2 * | 11/2010 | Skowaisa ............ | G01F 25/0061 702/104 |
| 2006/0189895 | A1 * | 8/2006 | Neel .................. | A61B 5/14532 600/584 |
| 2010/0089635 | A1 * | 4/2010 | Hoeland ................ | G01D 11/24 174/520 |

FOREIGN PATENT DOCUMENTS

| | | |
|---|---|---|
| EP | 1710359 A1 | 10/2006 |
| WO | 03106772 A1 | 12/2003 |

OTHER PUBLICATIONS

German Search Report issued on Nov. 19, 2014.

* cited by examiner

*Primary Examiner* — Erika J Villaluna
(74) *Attorney, Agent, or Firm* — Cowan, Liebowitz & Latman, P.C.; Steven D. Underwood

(57) ABSTRACT

A control head of a fluid measuring device (20, 40) has an outer housing (32) which has a surrounding shell surface (34), an open face side formed by a first opening (50) and facing the device (20, 30), an opposite open face side formed by a second opening (52), and a lateral opening (36) in the shell surface (34). The second opening (52) and the lateral opening (36) have substantially the same opening cross-section. The control head further has first and second closure units (60, 62) which each include a cover and a surrounding luminous ring (66) positioned on a housing side of the cover, the covers of the first and second closure units (60, 62) each being adapted to be configured as a blind cover (64) or as an electronic display (68), and each closure unit (60, 62) being adapted to be releasably coupled to the outer housing (32) both at the second opening (52) and at the lateral opening (36) to close the respective opening (36, 52).

6 Claims, 5 Drawing Sheets

CONTROL HEAD

FIELD OF THE INVENTION

The present invention relates to a control head of a fluid measuring device, including an outer housing which has a surrounding shell surface.

BACKGROUND

In electronically controlled valves or in flow meters, such control heads are placed on the respective device to control it or to transfer data from the device. The device onto which the control head is applied is a drive housing of a valve, for example, or the housing of a flow measuring device through which a flow channel extends. The term "flow measuring device" does also contain a fluid controlling device as a fluid controlling device additionally comprises a valve which is controlled based on the data received from the integrated measuring device. Thus, the present invention also provides a control head of a controlling device.

It is already known to provide control heads of this type with a luminous ring that visually reflects the operating condition (for example ON, OFF, defective).

Furthermore, there are control heads having lateral openings provided in the shell surface and through which the cabling is routed into the interior of the outer housing, for example.

It is the object of the invention to provide a control head that is suitable for flexible use.

SUMMARY

The present invention provides a control head of a fluid measuring device having an outer housing which includes a surrounding shell surface, an open face side formed by a first opening and facing the device, an opposite open face side formed by a second opening, and a lateral opening in the shell surface, the second opening and the lateral opening having substantially the same opening cross-section. The control head further has first and second closure units which each include a cover and a surrounding luminous ring positioned on a housing side of the cover, the covers of the first and second closure units each being adapted to be configured as a blind cover or as an electronic display. Each of the two closure units is adapted to be releasably coupled to the outer housing both at the second opening and at the lateral opening to close the respective opening.

The invention makes provision that the two closure units, each of which has a luminous ring, are adapted to be coupled to the second opening or to the lateral opening, in order to close that particular opening. This allows the display, for example, to be fitted to the lateral opening or to the second opening and thus to the free face side end of the sensor housing. Considering that the associated devices, i.e. the valve or the flow meter, are installed at different angles and in different positions, the invention allows the display to be simply moved to the optimum position for being viewed. The fact that at least one luminous ring is illuminated allows a light signal to be always obtained, regardless of whether the blind cover or the display is mounted to the light source. The light source is mounted within the outer housing.

According to an exemplary embodiment, the covers may be different, that is, one cover may be in the form of a blind cover and the other in the form of a display.

The display may constitute the entire end wall of the cover or a section of the end wall.

At least the second opening and the lateral opening should have identical opening cross-sections, which make it possible to exchangeably attach the units to any of the openings without great effort.

The luminous ring includes a continuously surrounding transparent outer ring and at least one light-conducting extension protruding radially inwards. Light can then be coupled in either indirectly or directly at this light-conducting extension protruding radially inwards. The light source may thereby be seated centrally while the luminous ring still has a uniform brightness distributed over the circumference.

Furthermore, a transparent light distributor may be seated in the luminous ring, which constitutes a part that is separate from the luminous ring and has light entry surfaces and light exit surfaces which are opposite the light-conducting extensions and by means of which the light is then coupled into the luminous ring. This division into two of the entire light conductor by means of a luminous ring and a light distributor which is separate therefrom, also referred to as a diffuser, allows to save costs in that the light distributor is in most cases of a very elaborate construction, whereas the luminous ring is of a simpler structure. The light distributor may then be firmly fastened to the outer housing at a preferred location, that is, it is not exchanged together with the closure units. Depending on whether the blind cover or the display is then coupled to the opening provided with the light distributor, the luminous ring of the blind cover or that of the display will give light.

One mounting ring each is provided between the luminous ring and the second opening and/or between the luminous ring and the lateral opening and is fitted to the outer housing. This mounting ring allows the expenditure in manufacturing the outer housing to be reduced since it is easier to form fastening geometries on the mounting ring than on the outer housing.

The mounting ring of the lateral opening may be pressed into the outer housing, for example. Any further fastening is not necessary here.

The first opening may also have a mounting ring provided thereon, which is preferably likewise pressed into the opening.

The mounting rings, at least the mounting rings of the lateral opening and of the second opening, are of identical configuration, that is, they are identical parts.

The mounting rings may have fastening geometries, in particular bayonet closure geometries, formed integrally therewith, by means of which the closure units are fastened to the outer housing. This allows the expenditure for manufacturing the outer housing itself to be reduced since it is not required to shape any complicated fastening means therein.

However, it is also possible to produce the outer housing in one piece with the mounting ring from a plastic material as an injection molded part.

Optionally, the mounting ring of the second opening may be releasably fastened in the outer housing, which allows to have the cross-section of the second opening not restricted by the mounting ring when it comes to installing parts into the housing. The mounting ring automatically reduces the cross-section of the opening, which may, in some circumstances, be a hindrance.

The luminous rings may have fastening geometries molded integrally therewith by means of which the units are fitted to the outer housing. This variant is especially cost-effective. Luminous rings are usually made from a plastic material. This means that fastening geometries can be shaped on such injection molded parts at low cost. The blind covers, which are possibly made of metal, or the complicated display, on the other hand, are much more difficult to equip with fastening means.

The luminous rings may have bayonet closure geometries molded integrally therewith, forming bayonet closures with the mating geometries on the mounting rings. Therefore, no further fastening means are required for attaching the two closure units to the outer housing.

One or more lamps may be provided in the outer housing in the region of the second opening, which are indirectly or directly optically coupled to the luminous ring. In this way, the ring that gives light is always the ring associated with the second opening.

To attain a further flexibility of the control head, according to one embodiment of the invention the second closure unit may be adapted to be circumferentially fastened to the outer housing in a plurality of orientations, in particular in steps of 90 degrees. This orientation of the display allows it to be placed in an optimum position for an observer. In addition, when a bayonet closure is used, the angularly stepped fastening orientations, in particular the steps of 90 degrees, can be realized in a very simple manner.

The control head according to the invention has no screws or bolts or other fastening means accessible from outside (outer housing plus closure units); rather, according to one embodiment, the closure units can be simply locked to the outer housing by means of the bayonet closures.

A further embodiment of the invention makes provision that the outer circumference of each luminous ring is positioned radially inwardly of the axially adjoining parts, which means it is protected by the adjoining parts because the luminous rings are slightly contracted inwards. The protective section is then, for example, the blind cover or the display on the outside and the outer housing or the mounting ring on the housing side.

DETAILED DESCRIPTION

Figure 1:
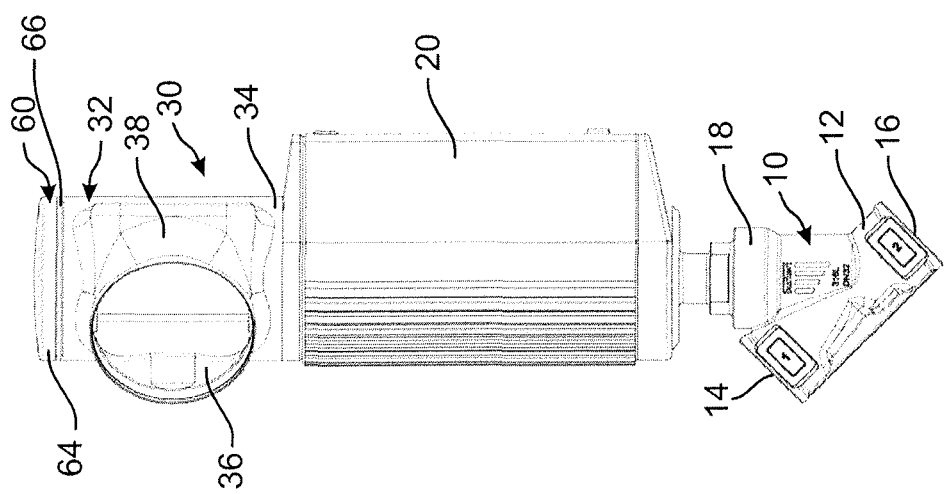
FIG. 1 shows a side view of a fluid controlling device with a control head according to the invention.

FIG. 1 illustrates a fluid controlling device in the form of a valve including a valve housing 10 which includes a tubular section having an inlet 14 and an outlet 16 for fluid. A connecting piece 18 receives a valve body which can open or close the fluid connection between the inlet 14 and the outlet 16. The valve plunger is moved by an actuator which is accommodated within a device housing 20. The actuator may be driven hydraulically, pneumatically or electrically.

The valve is controlled by means of a control head 30 which is placed on the actuator on the face side.

The control head 30 contains the open-loop control, closed-loop control and/or measuring electronics for the actuator and, preferably, for the entire valve.

The control head 30 comprises a tubular outer housing 32 which has a surrounding shell surface 34 having a lateral opening 36 formed therein. The opening 36 is part of a lateral bulge 38 of the outer housing 32.

Figure 2:
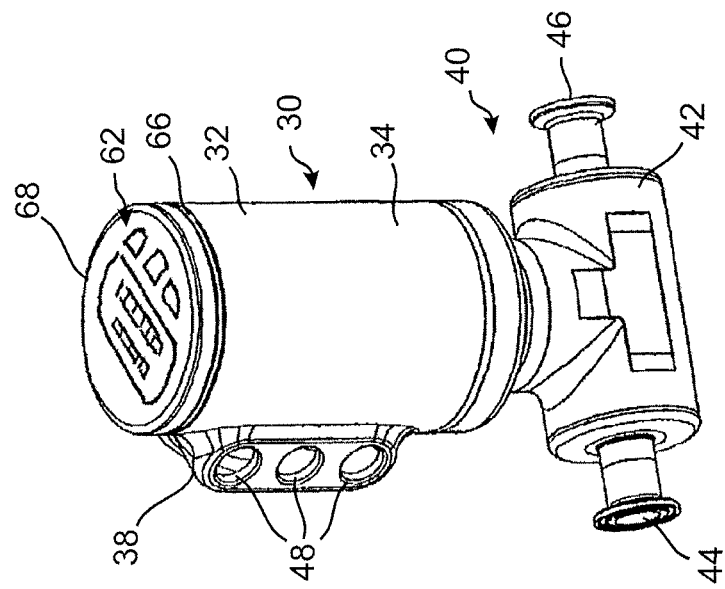
FIG. 2 shows a fluid measuring device with the control head according to the invention.

FIG. 2 illustrates a fluid measuring device 40, i.e. a flow meter having a housing 42 which has an inlet 44 and an outlet 46 through which fluid flows. The amount of fluid flowing through the device 40 per unit time is determined. The control head 30 illustrated in FIG. 1 is placed on the housing 42 here, too. The control head 30 here also includes the open-loop control, closed-loop control and/or measuring electronics for the device 40.

The lateral opening 36, which is provided in the outer housing 32 here too, is not visible in FIG. 2 since it faces the rear, that is, it is concealed. But, instead, lateral connecting openings 48 can be seen, which are not visible in FIG. 1, for connecting electric, hydraulic and/or pneumatic components, the openings 48 being formed laterally at the bulge 38, more precisely on a substantially circumferentially directed, e.g. flat wall section 49 of the bulge 38.

The bulge 38 has a tubular section 51 which is perpendicular to the tubular section 53 having the first and second openings on its face sides. The bulge still further has a cylindrical section 55 which adjoins both tubular sections 51, 53 in the transition region and which, in cross-section, has an elongated O-shape that can be seen in conjunction with the flat wall section 49.

Figure 3:
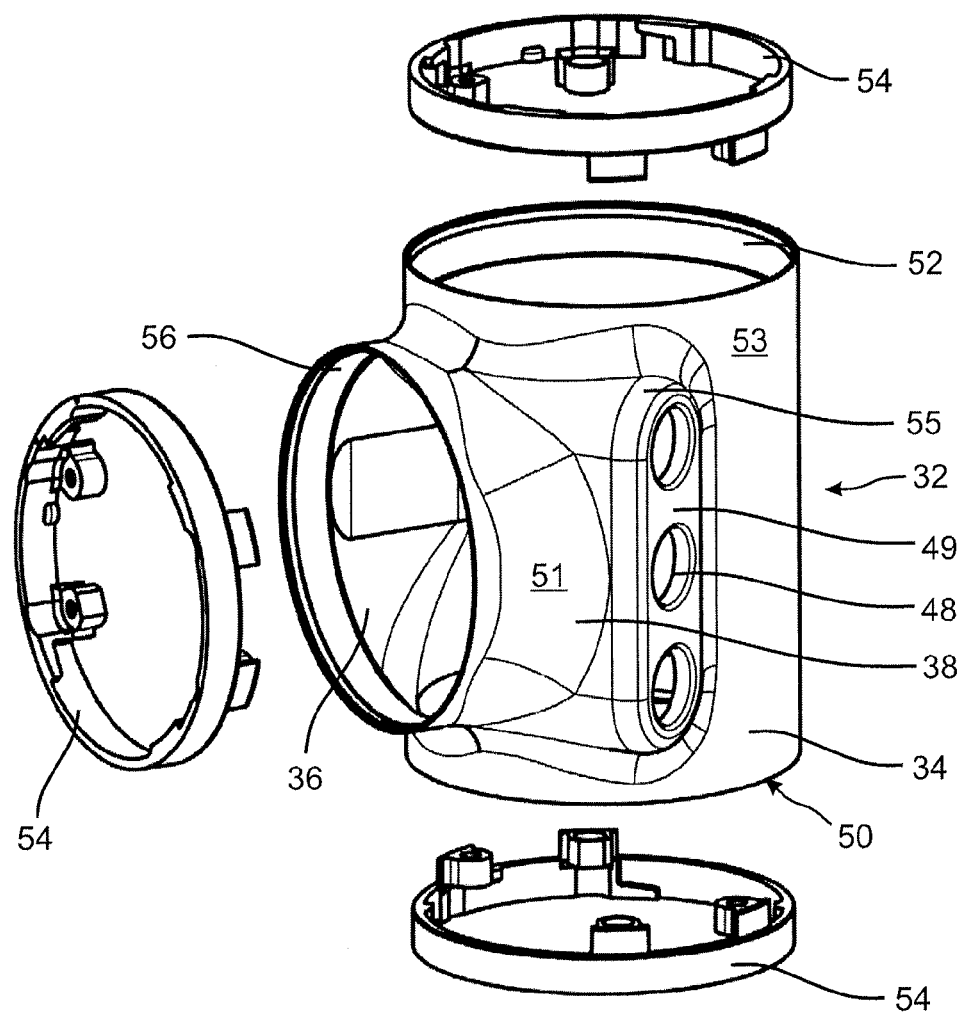
FIG. 3 shows a side view of the outer housing used in the control head according to the invention, with mounting rings.

The outer housing 32 can be seen better in FIG. 3. Except for the bulge 38, the shell surface 34 is cylindrical.

The outer housing 32 has a total of three openings. A first opening 50 defines a completely open lower face side. This opening 50 faces the respective device, that is, the actuator or the housing 42, and is open with respect thereto. The opposite face side of the outer housing 32 is also completely open; the corresponding opening is referred to as second opening 52. It also defines the entire face side. The third opening is the lateral opening 36.

Preferably, three identical mounting rings 54 are provided for locking the adjacent components to the outer housing 32.

The mounting ring 54 for the lateral opening 36 and the mounting ring 54 for the first opening 50 are pressed into the respective opening, without any further attachment being required. In this connection it is particularly advantageous if the mounting rings 54 are made of aluminum, which is especially resilient.

The outer housing 32 may be made of steel or aluminum; this should not be understood in a limiting sense.

For an optimum pressing-in process, identically formed opening rims 56 are provided on the lateral opening 36 and on the first opening 50.

Since the mounting rings 54 are identical parts, the openings 50, 52 and 36 are preferably configured to have substantially the same opening cross-sections. Even if the openings 50, 52, 36 slightly deviate from one another, the same opening cross-section will then be obtained at any rate at least for the second opening 52 and the lateral opening 36, based on the identically configured mounting rings 54.

The second opening 52 is also provided with a mounting ring 54 which, however, is not pressed in, but is connected by a fastening means discussed still further below, to allow it to be nondestructively releasably removed. In fact, the entire opening cross-section of the second opening 52 is then available for reaching the interior of the outer housing 32.

The lateral opening 36 and the second opening 52 are closed by two closure units 60, 62 which can be fitted to the outer housing so as to be nondestructively releasable and also are removable again.

The first closure unit is shown in FIG. 1 and comprises a blind cover 64 and a luminous ring 66 fastened to the blind cover and positioned between the blind cover 64 and the outer housing 32.

The second closure unit 62 is shown in FIG. 2 and comprises an electronic display 68 which is formed on the face side of the closure unit 62, and likewise a luminous ring 66. Here, too, the luminous ring 66 is arranged between the display 68 and the outer housing 32.

The two luminous rings 66 are identical parts.

The closure units 60, 62 are exchangeable, i.e. they can selectively close the second opening 52 or the lateral opening 36.

In FIG. 1, the first closure unit 60 is applied to the second opening 52, and the second closure unit will be applied to the lateral opening 36 (in FIG. 1 this has not yet been effected).

In the embodiment according to FIG. 2 it is the other way round; here, the first closure unit is intended to close the lateral opening 36, and the second closure unit 62 closes the second opening 52.

Depending on the installation situation of the device, it can therefore be freely selected whether the display is positioned on the face side or at the side. When the longitudinal axis of the device (center axis of the control head) is arranged vertically, for example, it is advantageous to provide the display 68 at the lateral opening.

When the longitudinal axis of the control head 30 extends vertically, the display 68 will have its optimum fitting position on the upper face side.

Figure 5:
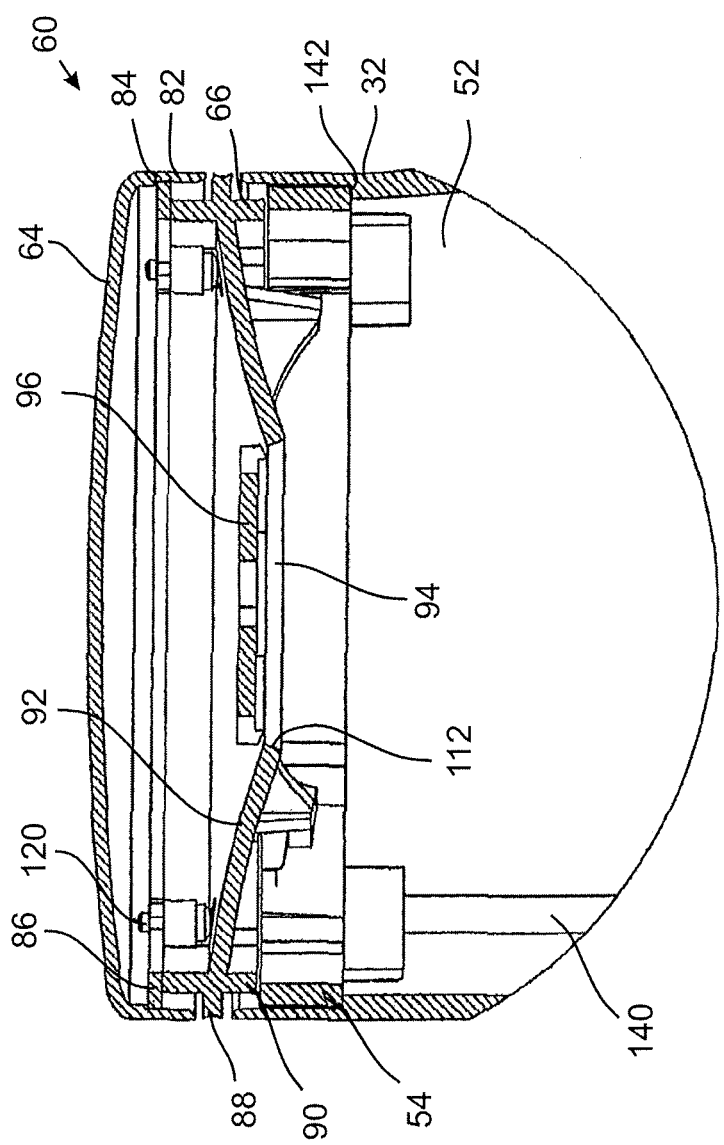
FIG. 5 shows an enlarged cross-sectional view of the control head according to the invention in the region of the upper open face side.
Figure 7:
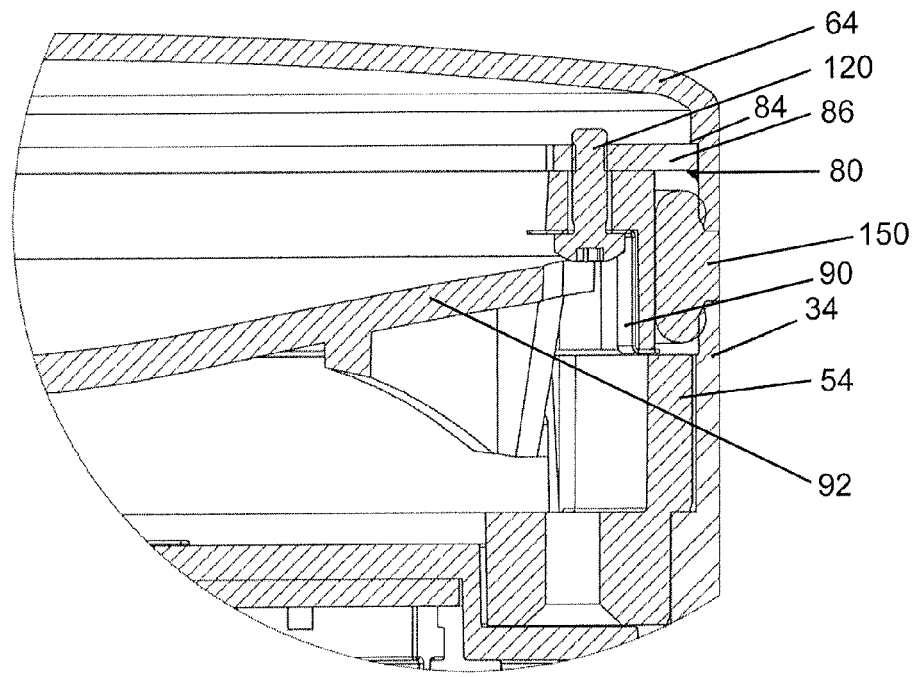
FIG. 7 shows an enlarged view of an edge of the control head according to FIG. 6.

FIG. 5 shows an enlarged cross-sectional view of the first closure unit 60 fitted to the second opening 52 (see FIG. 1). The blind cover 64 has a pot shape and has in its interior a shoulder 84 in the region of its surrounding edge 82, the shoulder 84 having a disk 86 pressed into it which has several recesses and radial projections. The disk 86 is welded to the blind cover 64, for example (see weld seam 80 in FIG. 7) if both parts are made of metal.

Figure 4:
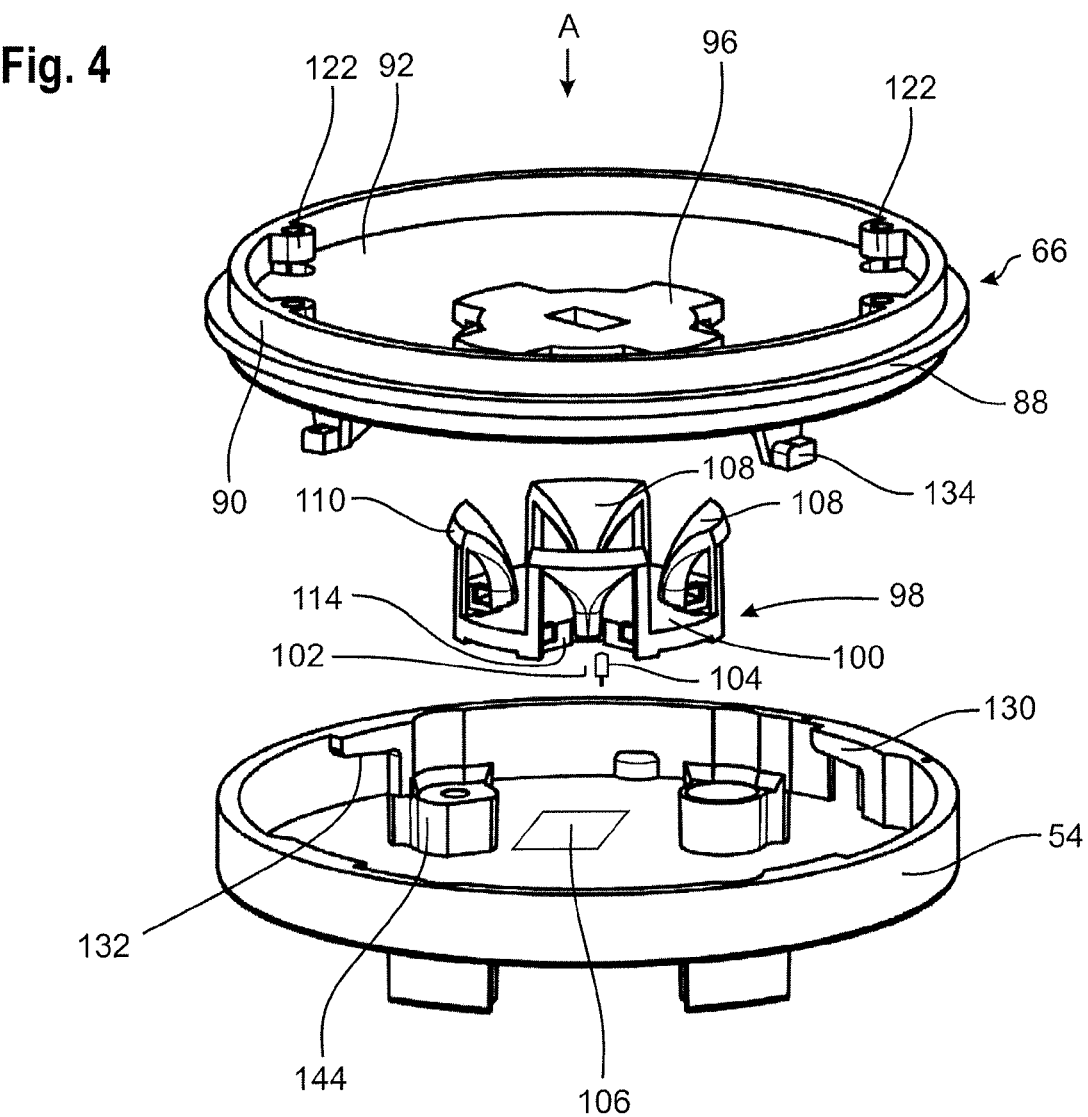
FIG. 4 shows one of the mounting rings shown in FIG. 3, together with a luminous ring and a light distributor.

The luminous ring 66 can be seen well in FIGS. 4 and 5. It has a surrounding, transparent, radially projecting outer ring 88 which transitions in one piece into a tube section 90 which is located radially inwards. The tube section 90 is positioned axially between the disk 86 and the mounting ring 54 and rests against them on both opposite end faces (see FIG. 5).

The luminous ring 66 further has a light-conducting extension 92 which starts from the outer ring 88, protrudes radially inwards and has a disk-shaped design.

As seen in the side view according to FIG. 5, the light-conducting extension 92 runs radially inwards, more specifically in a curved manner towards the inside of the outer housing 32, that is, obliquely away from the blind cover 64.

The luminous ring 66 has a central opening 94 which at the same time constitutes a central opening of the light-conducting extension 92.

A roof-shaped central section 96 is integrally molded with the light-conducting extension 92 over the central opening 94.

A light distributor 98 arranged below the luminous ring 66 protrudes into the central opening 94 (see FIG. 4). But the larger portion of the light distributor 98 is located in the region of the mounting ring 54.

Like the luminous ring 66, the light distributor 98 is injection molded from a transparent plastic material and comprises a base plate 100 which is disk-shaped and has a plurality of recesses 102 into each of which at least one lamp 104, preferably an LED lamp, protrudes which is fastened to a circuit board 106 that is only symbolically shown in FIG. 4. The circuit board 106 is positioned within or below the mounting ring 54, for example. The lamps 104 then protrude upwards into the recesses 102.

Dome segment-shaped light-conducting extensions 108 that are integrally molded with the light distributor 98 extend over the recesses (see FIG. 4).

The upper free ends of the light-conducting extensions have light exit surfaces 110 formed thereon which, in an axial view, have the shape of a circular arc section (see arrow A in FIG. 4).

The light exit surfaces 110 are directly opposite to face side surfaces 112 (FIG. 5) of the light-conducting extension 92 on the luminous ring 66, only a small gap existing between the surfaces.

In the region of the base plate 100, around the respective lamp 104, the light distributor 98 has light entry surfaces 114, so that the light is conducted from the lamp via the light entry surfaces 114 to the corresponding light exit surfaces 110 and then into the luminous ring 66.

The light entry and light exit surfaces 114 and 110 extend at an angle to each other.

The light entry surfaces 114 preferably extend in a plane parallel to the longitudinal axis of the luminous ring 66.

The light exit surfaces 110, on the other hand, extend radially obliquely outwards and, furthermore, are directed slightly to outside the outer housing 32 also axially, as shown by FIGS. 4 and 5.

Since the lamps 104 and the light distributor 98, which has a relatively complicated structure, are always arranged inside the housing 32 in the region of the second opening 52, they are not exchanged when the closure units 60, 62 are removed or exchanged.

With the lamps 104 activated, the luminous ring 66 gives a very uniform light distributed over the circumference, only the outer ring 88 being visible from outside.

As shown in FIG. 5, the outside diameter of the outer ring 88 is somewhat smaller than the outside diameter of the directly adjacent axial end of the blind cover 64. Likewise, the outside diameter of the transparent outer ring 88 is somewhat smaller than the outside diameter of the adjacent end of the outer housing 32, so that the outer ring 88 runs so as to be slightly depressed and to be protected.

Rather than the blind cover 64, the display 68 may also be positioned here, which is also provided on the inside with a corresponding disk 86 which serves to mount the luminous ring 66 both to the display 68 or to the blind cover 64.

The luminous ring 66 is fastened to the disk 86 by way of a plurality of bolts 120, for example, which project through openings in radially inwardly protruding noses 122 on the luminous ring 66 (see FIG. 4). The disk 86 likewise has mating threaded extensions in these areas, so that the bolts 120 are guided through the openings in the noses 122 from below and screwed into the threads on the disk 86. Thereby, the luminous ring is fastened to the blind cover 64 or to the display 68 to constitute a prefabricated unit therewith.

The closure units 60, 62 are fastened to the outer housing 32 by means of a coupling of the luminous ring 66 to the associated mounting ring 54.

In fact, the luminous ring 66 and the mounting ring 54 have integrally molded fastening geometries which come into engagement with each other with an interlocking fit.

In the embodiment illustrated, which should not be understood in a limiting sense, a respective bayonet closure is provided between each mounting ring 54 and the closure units 60, 62.

To this end, the mounting ring includes bayonet closure geometries 130 protruding radially inwards, more specifically preferably four bayonet closure geometries 130 uniformly distributed on the circumference (see FIG. 4).

The bayonet closure geometries 130 here are shoulders which protrude inwards and have obliquely extending wedge surfaces 132 on their lower sides that serve for locking purposes.

The luminous ring 66 has feet 134 projecting radially outwards, more particularly four feet which are uniformly distributed over the circumference.

These four feet 134 engage behind the bayonet geometries 130 and, during insertion by twisting, are pushed along the wedge surfaces 132 axially towards the interior of the outer housing 32, so that a bayonet closure is obtained.

Based on the bayonet closure geometries distributed on the circumference, the display 68 may be inserted in the outer housing 32 in several circumferential positions, more particularly in several steps of 90 degrees. An even larger number of bayonet closure geometries arranged distributed on the circumference allows still smaller steps to be attained.

As can be seen in FIGS. 1 and 2, the outer housing 32 is designed without a screw or bolt accessible from the outside, so that the outer housing 32, along with its closure units 60, 62, is smooth and the entire device, along with the control head, is suitable for use above all in the food industry.

As mentioned above, the mounting ring 54 of the first opening 52 is not pressed into the outer housing 32, but releasably fastened in the outer housing 32. For this purpose, a plurality of long bolts 140 is provided distributed on the circumference. The mounting ring 54 rests against a shoulder 142 on the outer housing 32. The bolts 140 are fitted from above into openings in radially inwardly projecting noses 144 of the mounting ring 54 (see FIG. 4) and extend as far as to the mounting ring 54 of the first opening 50, which either has mating threads provided therein or below which nuts are screwed onto the ends of the bolts 140.

Figure 6:
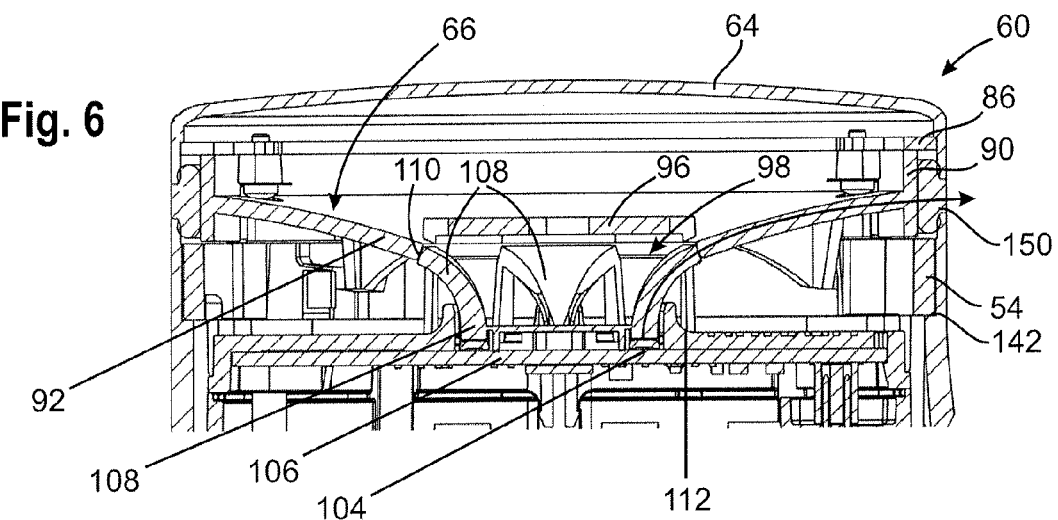
FIG. 6 shows an enlarged cross-sectional view of the further variant of the control head according to the invention in the region of the upper open face side.

Except for a few details, the variant embodiment according to FIG. 6 corresponds to that in the preceding Figures, so that only the differences will be discussed. FIG. 6 further shows some common details of the embodiments in more detail than the above, such as, e.g., the circuit board 106 with the lamp 104 and the coupling of the light distributor 98 to the luminous ring 66.

Unlike in the preceding embodiment according to FIG. 5, in FIG. 6 the 15 outer ring is a separate part which is n the form of a sealing ring 150 and is axially clamped between the cover and the outer housing 32. The sealing ring 150 is transparent and rests against the tube section 90 on the inside over the entire surface. A surrounding bead 152 protruding radially outwards is clamped and conducts the light emitted by the light sources 104 to the outside. The 20 course of light is show by an arrow in FIG. 6.

Generally, depending on the variant, two blind covers or two displays or one display and one blind cover may be used. When two blind covers are used, an external display may be provided.

Furthermore, a radio transmission unit for data transmission may also be integrated in the control head.

As can be seen in all of the Figures, the outer housing 32, along with the closure units 60, 62 fastened to it, is configured without any screws or bolts visible on the outside and accessible from outside. This preferably also applies to the device housings 20, 42.

The one-piece outer housing 32, which has no weld seams, is produced by hydroforming of a tube, the bulge 38 also being shaped by the forming process, so that a housing 32 is obtained without any edges, weld seams, steps or the like.

The transitions of the individual sections 51, 53, 55 are configured to have large radii and to be harmonious.

The external dimensions of the closure units 60, 62 correspond to those of the adjacent section of the device housing 20 and 42.

The control head housing is releasably fitted to the device housing 20 and 42 without an externally visible threaded joint, preferably also by a bayonet closure.

The invention claimed is:

1. A control head of a fluid measuring device, comprising an outer housing which has a surrounding shell surface, an open face side formed by a first opening and facing the device, an opposite open face side formed by a second opening, and a lateral opening in the shell surface, the second opening and the lateral opening having substantially the same opening cross-section, and comprising first and second closure units which each include a cover and a surrounding luminous ring positioned on a housing side of the cover, the covers of the first and second closure units each being one of a blind cover and an electronic display, and each closure unit being adapted to be releasably coupled to the outer housing both at the second opening and at the lateral opening to close the respective opening,
wherein each luminous ring includes a continuously surrounding transparent outer ring having at least one light-conducting extension adjoining it on an inside, and protruding radially inwards.

2. The control head according to claim 1, wherein at least one light conducting extension is molded integrally with the transparent outer ring.

3. The control head according to claim 1, wherein the outer ring is a separate part which is configured as a sealing ring and is axially clamped between the cover and the outer housing.

4. The control head according to claim 1, wherein a transparent light distributor protrudes into the luminous ring at least in sections and constitutes a part that is separate from the luminous ring and has light entry surfaces and light exit surfaces opposite the light-conducting extension.

5. A control head of a fluid measuring device, comprising an outer housing which has a surrounding shell surface, an open face side formed by a first opening and facing the device, an opposite open face side formed by a second opening, and a lateral opening in the shell surface, the second opening and the lateral opening having substantially the same opening cross-section, and comprising first and second closure units which each include a cover and a surrounding luminous ring positioned on a housing side of the cover, the covers of the first and second closure units each being one of a blind cover and an electronic display, and each closure unit being adapted to be releasably coupled to the outer housing both at the second opening and at the lateral opening to close the respective opening,
wherein one mounting ring which is fitted to the outer housing is provided between the luminous ring and the second opening and a further mounting ring is provided between the luminous ring and the lateral opening, wherein the mounting rings have fastening geometries by means of which the closure units are fastened to the outer housing, wherein the luminous rings have fastening geometries molded integrally therewith by means of which the closure units are fitted to the outer housing so as to be nondestructively releasable, and wherein the luminous rings have bayonet closure geometries molded integrally therewith to form bayonet closures with mating geometries on the mounting rings.

6. A control head of a fluid measuring device, comprising an outer housing which has a surrounding shell surface, an open face side formed by a first opening and facing the device, an opposite open face side formed by a second opening, and a lateral opening in the shell surface, the second opening and the lateral opening having substantially the same opening cross-section, and comprising first and second closure units which each include a cover and a surrounding luminous ring positioned on a housing side of the cover, the covers of the first and second closure units each being one of a blind cover and an electronic display, and each closure unit being adapted to be releasably coupled to the outer housing both at the second opening and at the lateral opening to close the respective opening, wherein a plurality of lamps are provided in the outer housing in the region of the second opening and are optically coupled to the luminous ring.

* * * * *